May 27, 1969

R. A. HANSON ET AL 3,445,991

SELF-PROPELLED MOWER

Filed Sept. 3, 1965

INVENTORS
RUDOLPH A. HANSON
FRANK J. DEPTULA

BY Beaman & Beaman

ATTORNEYS

INVENTORS
RUDOLPH A. HANSON
FRANK J. DEPTULA

ATTORNEYS

May 27, 1969

R. A. HANSON ET AL
SELF-PROPELLED MOWER 3,445,991

Filed Sept. 3, 1965

INVENTORS
RUDOLPH A. HANSON
FRANK J. DEPTULA

BY Beaman & Beaman

ATTORNEYS

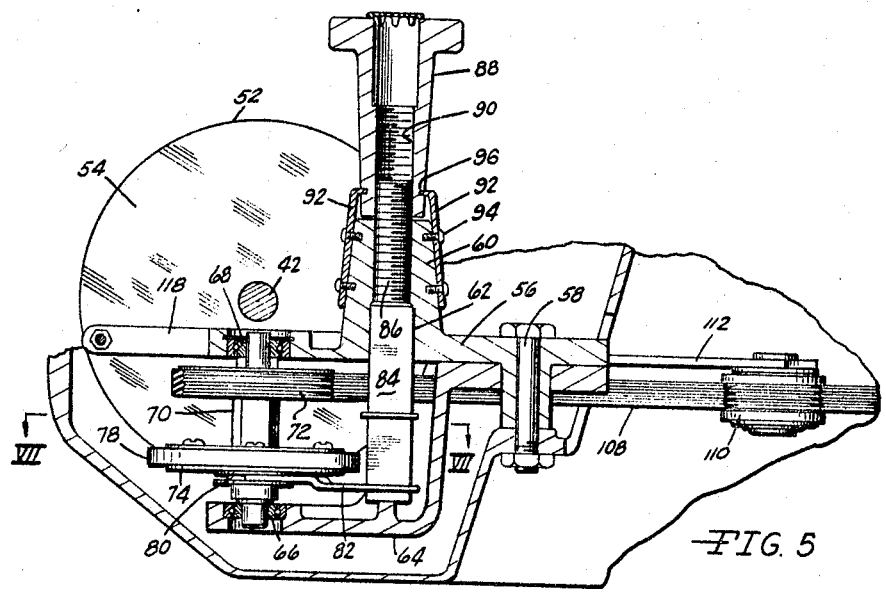
FIG. 5
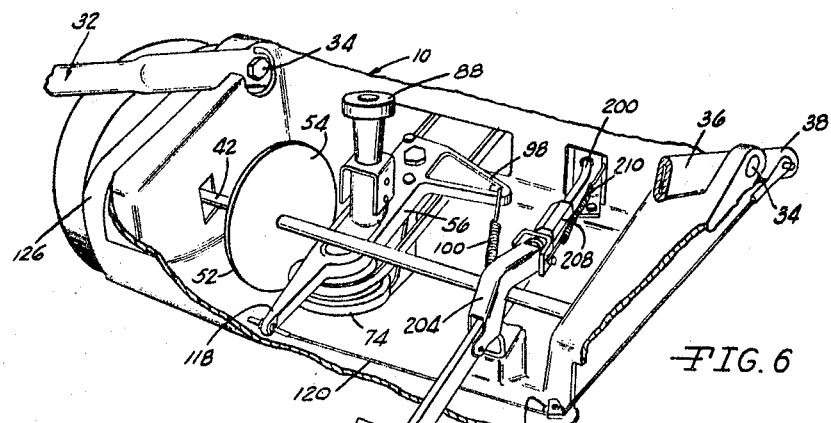
FIG. 6
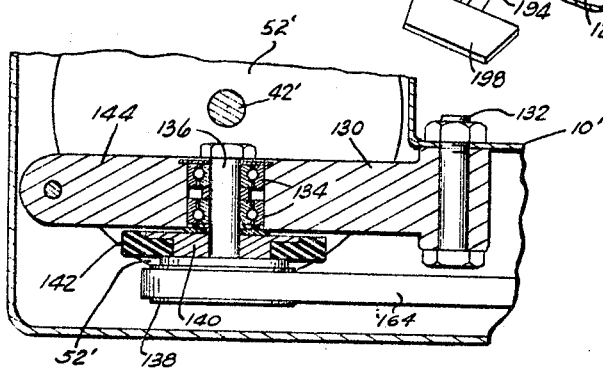
FIG. 8
INVENTORS
RUDOLPH A. HANSON
FRANK J. DEPTULA
ATTORNEYS May 27, 1969
R. A. HANSON ET AL
3,445,991
SELF-PROPELLED MOWER
Filed Sept. 3, 1965
Sheet 5 of 5
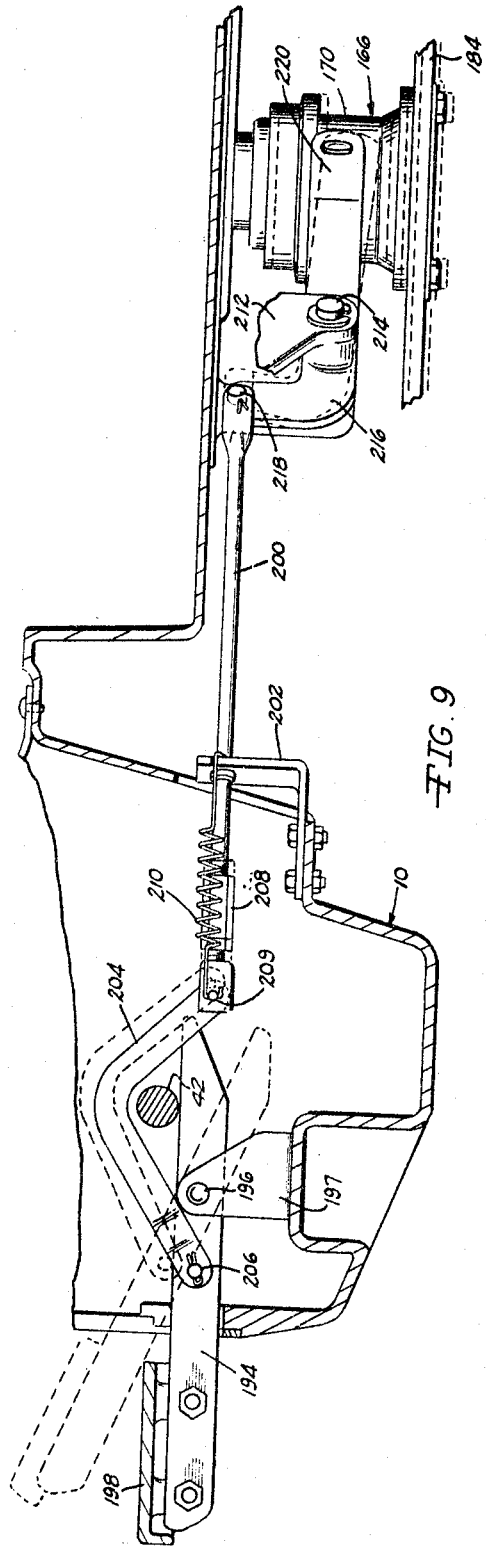
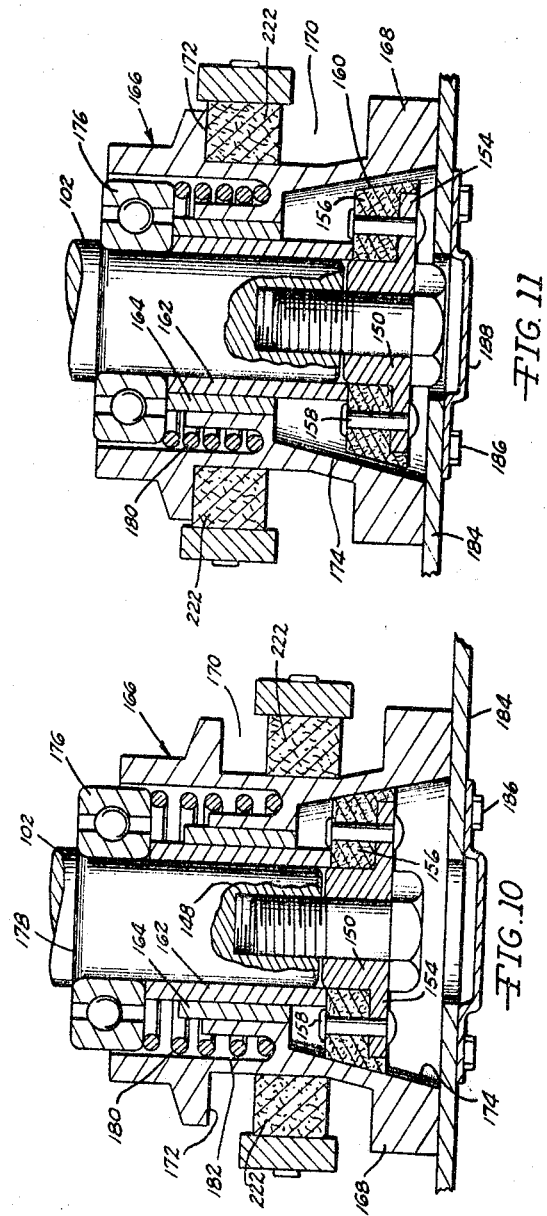
INVENTORS
RUDOLPH A. HANSON
FRANK J. DEPTULA
BY Beaman & Beaman
ATTORNEYS

United States Patent Office 3,445,991
Patented May 27, 1969

3,445,991
SELF-PROPELLED MOWER
Rudolph A. Hanson and Frank J. Deptula, Jackson, Mich., assignors to Yard-Man, Inc., Jackson, Mich., a corporation of Michigan
Filed Sept. 3, 1965, Ser. No. 484,800
Int. Cl. A01d 35/26
U.S. Cl. 56—25.4          6 Claims

ABSTRACT OF THE DISCLOSURE

A drive arrangement for a lawn mower, particularly a rotary lawn mower, utilizing a driven disc frictionally engaged by a driving wheel radially adjustable upon the disc, and engagement between the friction wheel and disc is controlled by the position of the steering handle for the mower.

---

Figure 1:
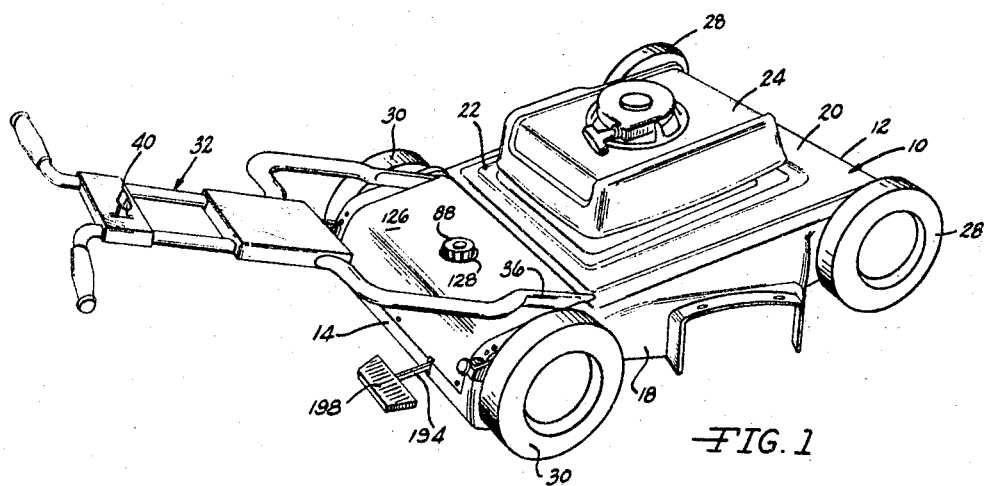

The majority of rotary lawn mowers, those lawn mowers employing an elongated cutting blade rapidly rotating on a vertical axis, being sold today are of the "push" or nonself-propelled type. This means that the engine provides the motive power for rotating the blade only and the progress across the lawn must be accomplished by the operator exerting a "push" on the lawn mower handle.

A number of self-propelled rotary lawn mowers are available wherein the engine provides the power for propelling the mower. However, the construction of previously offered self-propelled mowers has been such as to necessitate a considerably higher price, compared with nonself-propelled models, and the added apparatus and mechanism has caused a great deal of maintenance problems. One of the most common type self-propelling rotary lawn mowers includes small friction drive wheels which are drivingly connected to the engine and frictionally engage the ground wheel tire. This construction is not completely satisfactory, as grass clippings, leaves and other foreign matter often cling to the ground wheel and drive wheel causing the apparatus to clog, slip and malfunction. Drive mechanisms which rotate the axle of the drive wheel, or the drive pinion have not been completely acceptable, in that the clutching mechanism has rendered the devices rather complicated and the power transmission to the wheels is troublesome. Some self-propelled mowers also are provided with speed-changing means, whereby the rate of movement of the mower may be varied at a given engine speed. Such speed-changing devices usually incorporate gear boxes and other transmissions which are of an expensive and complex nature.

It is a basic object of the invention to provide a self-propelled rotary lawn mower having an improved drive mechanism which is relatively economical to manufacture, and is capable of providing a long trouble-free service life.

Another object of the invention is to provide a relatively simple mechanism for propelling a rotary lawn mower which is capable of producing variable velocities of lawn mower movement at a given engine r.p.m.

A further object of the invention is to provide a variable speed self-propelled lawn mower drive mechanism wherein clutching and declutching of the mechanism may be readily accomplished through the positioning of the handle of the lawn mower.

Another object of the invention is to provide a self-propelled lawn mower mechanism wherein engagement and disengagement of the mechanism may be easily accomplished and clutching engagement of the mechanism may be gradually accomplished as to avoid abrupt starts.

A further object of the invention is to provide a self-propelled lawn mower mechanism which may be housed within the confines of the lawn mower for protection against dirt, grass clippings, and other foreign matter and, yet the lawn mower configuration need not be bulky or substantially deviate from the configuration of a nonself-propelled mower.

Another object of the invention is to provide a blade clutch for a rotary lawn mower wherein the blade-clutching mechanism may be directly mounted upon the engine crankshaft concentric thereto, and occupies a minimum of space.

A further object of the invention is to provide a blade clutch for a rotary lawn mower wherein braking of the blade rotation upon disengagement of the blade from the power source is automatically accomplished upon declutching of the blade.

Another object of the invention is to provide a blade clutch for a rotary lawn mower wherein declutching of the blade raises the blade from the grass and during clutching the blade is moved toward the grass.

Figure 4:
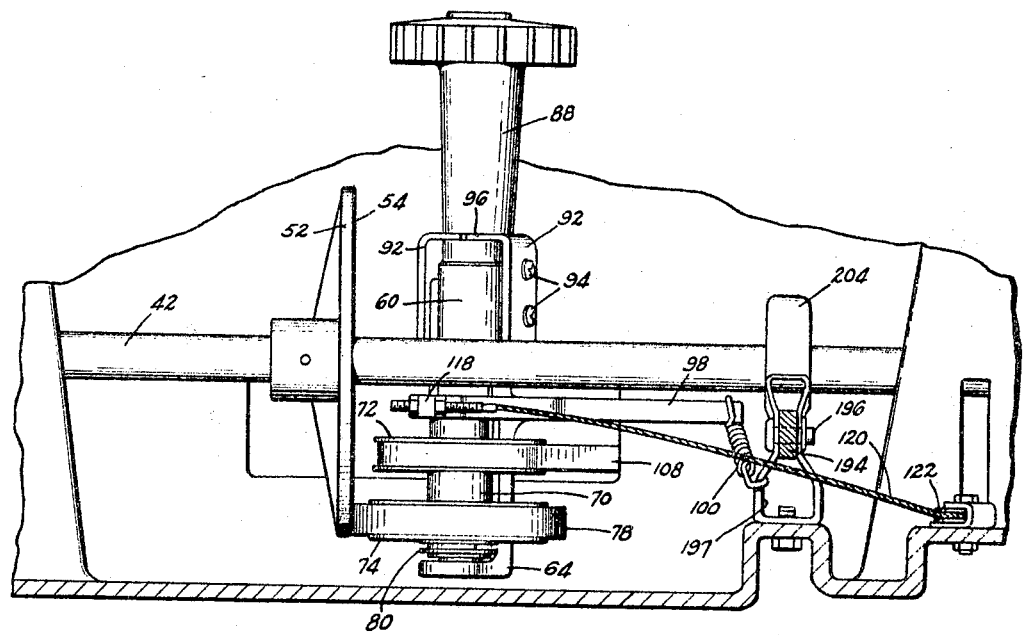
Figure 2:
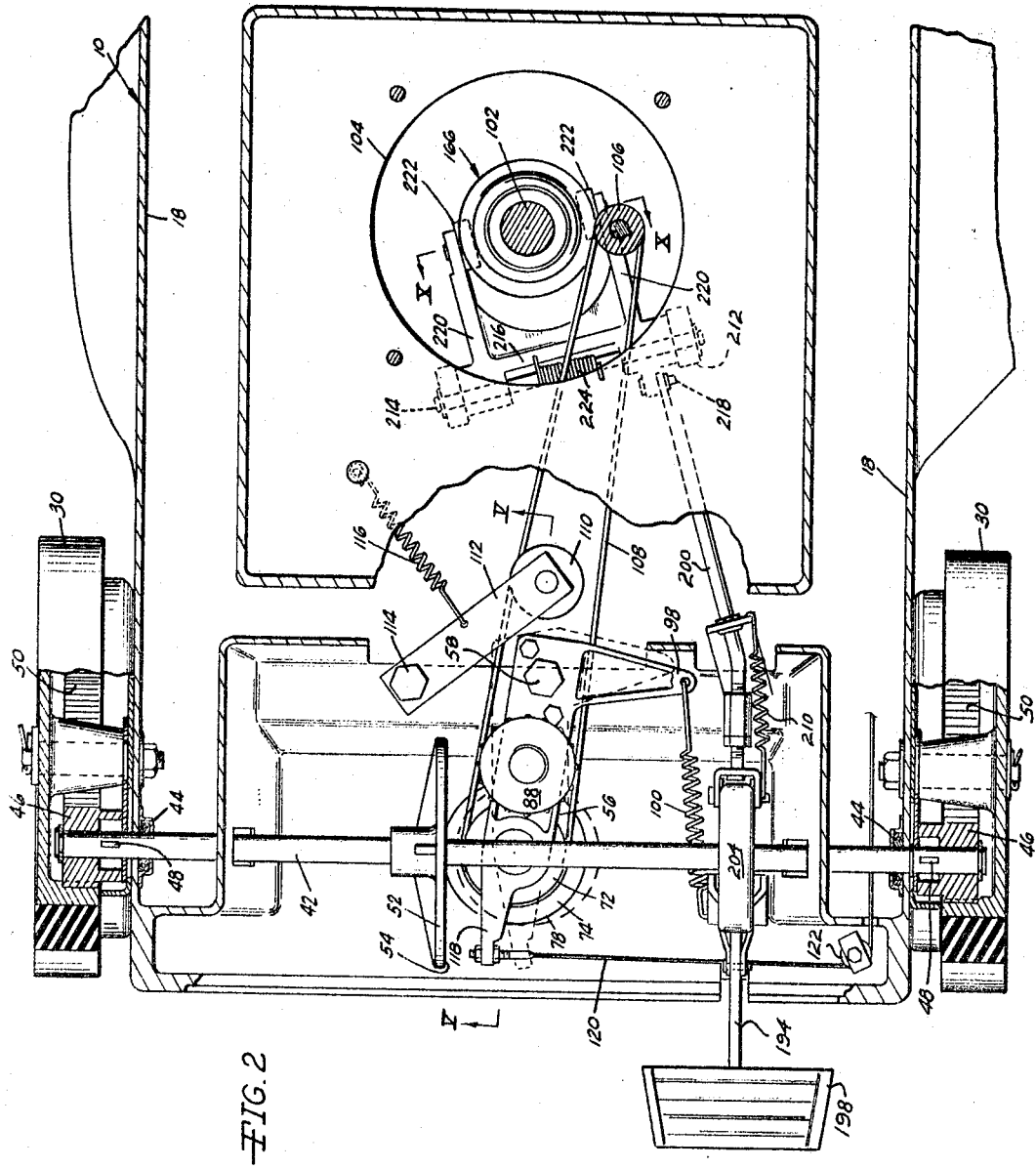
Figure 3:
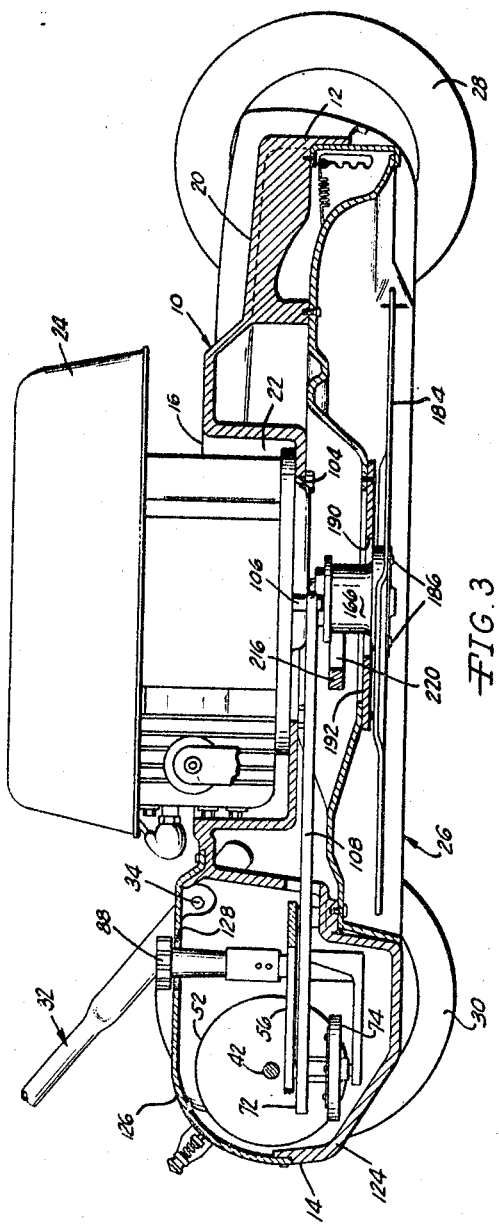
Figure 7:
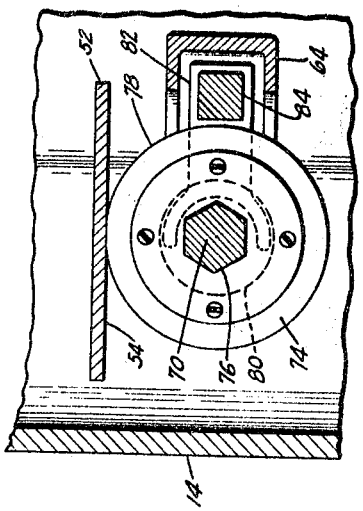

These and other objects of the invention arising from the details and relationships of the components of an embodiment thereof will be apparent from the following description and accompanying drawings wherein:

FIG. 1 is a rear and side perspective view of a self-propelled lawn mower constructed in accord with the invention, FIG. 2 is an enlarged, detail, plan, cut-away view of the wheel drive and brake clutch mechanism in accord with the invention, FIG. 3 is an elevational, sectional view of a lawn mower in accord with the invention, taken in a longitudinal direction, FIG. 4 is an enlarged, rear, detail view of the disk and friction drive wheel in accord with the invention, FIG. 5, is an elevational, sectional view of the friction wheel support assembly, as taken along section V—V of FIG. 2, FIG. 6 is an elevational, perspective, cut-away view of the rear of the lawn mower, illustrating the connection of the handle to the friction drive wheel assembly, FIG. 7 is a plan, detail, section view through the friction drive assembly, as taken along sectional VII—VII of FIG. 5, FIG. 8 is an elevational, sectional, detail view of an economy embodiment of the invention which does not provide a variable speed, FIG. 9 is a detail, elevational cut-away view of the blade clutch mechanism, illustrating the blade declutch position in full lines and the blade engaged position in dotted lines, the drive wheel transmission not being shown, FIG. 10 is a diametrical, elevational, sectional view of the blade clutch as taken along section X—X of FIG. 2, illustrating the clutch in the engaged position, and FIG. 11 is a view similar to FIG. 10, illustrating the blade clutch in the disengaged position.

The overall appearance of a lawn mower incorporating the concepts of the invention will best be appreciated from FIGS. 1 through 3. The lawn mower includes a frame 10 having a front portion 12, a rear portion 14, and a central region 16. Lateral sides 18 depend from the deck 20 of the frame, and the deck is provided with a motor-receiving recess 22, FIG. 3, adapted to receive the internal combustion engine 24 therein. A separate blade housing 26 is affixed to the frame 10 below the deck 20, and the entire cutting operation occurs within the blade housing, as will be later apparent. The separate construction of the frame member 10 and the blade housing 26 is more fully disclosed in U.S. Patent 3,299,622.

The lawn mower frame member is supported upon ground wheels 28 and rear ground wheels 30. The ground wheels are, preferably, connected to the frame by means of adjusting means for vertically positioning the wheels relative to the frame to permit variation in the height of the cutting operation. Such wheel adjusting means forms no part of the instant invention and are not disclosed in detail. A handle 32 is pivotally mounted on the frame member 10 by means of a pair of spaced pivot pins 34, FIG. 6. The right handle portion 36 includes a projection 38 extending beyond the associated pivot pin 34 for a purpose which will be later described. A throttle control 40 may be mounted on the handle, if desired, and connected to the engine by means of a Boden wire.

The rear wheels 30 of the lawn mower are driven by means of a drive shaft 42 rotatably mounted on the frame member by ball bearings 44. The ends of the drive shaft 42 are provided with pinion gears 46 which are rotatably mounted on the drive shaft and are keyed thereto by means of a one-way sliding dog 48 of conventional construction. Internally, the rear drive wheels 30 are provided with a ring gear 50 meshing with the pinion gears 46. Upon rotation of the drive shaft 42 in the clockwise direction, FIG. 3, the pinion gears are driven in a like direction which causes the drive wheels 30 to move the mower forward.

A friction drive disk 52 is affixed to the drive shaft 42 intermediate the lateral sides 18 of the frame. The disk 52 includes a flat friction drive surface 54 which may be slightly roughened to increase the frictional engagement with the friction drive wheel and is perpendicular to the shaft 42.

The friction drive wheel mechanism includes a lever arm 56 which is pivotally mounted on the frame member by means of a pivot bolt 58, FIG. 5. The pivot bolt 58 extends perpendicularly to the direction of the axis of the drive shaft 42 and is spaced forwardly thereof. In this manner, the lever arm 56 may be pivoted back-and-forth in a horizontal plane wherein the rear regions of the lever arm are moved toward and away from the disk driving surface 54. The lever arm 56 includes a vertically extending boss 60 having a bore 62 defined therein. Additionally, the lever arm includes a downwardly extending portion 64 which extends rearwardly and provides a support for the lower ball bearing 66, FIG. 5. The upper ball bearing 68 is mounted in the upper portion of the lever arm 56, and the bearings rotatably support a shaft 70 thereon. The shaft 70 is, preferably, of a hexagonal configuration intermediate the bearings and a sheave or pulley 72 is affixed thereto concentric to the axis of the shaft 70.

The friction drive wheel 74 is mounted upon the shaft 70 and includes a hexagonal bore 76, FIG. 7, which causes the drive wheel to rotate with the shaft 70, but permits the drive wheel to be axially translated upon the shaft. The axis of the shaft 70 is, preferably, radially disposed to the axis of the drive shaft 42 and, thus, as the friction drive wheel 74 is axially positioned on the shaft 70, the radial position of the drive wheel relative to the drive shaft 42 is varied. The friction drive wheel 74 includes an outer periphery 78 of a high friction material, such as rubber or neoprene, and the drive wheel also includes a grooved portion 80 adapted to receive a yoke 80.

The yoke 80 is mounted upon the lower end of the plunger 84 adapted to reciprocate in the bore 62. The upper portion of the plunger 84 is threaded at 86, and a knob 88, having a threaded bore 90, is threaded upon the upper end of the plunger. A pair of retainer members 92 are affixed to the upper extending boss 60 by screws 94, and include an upper end received within an annular groove 96 defined in the knob 88. Thus, the knob 88 is restrained against axial movement in a vertical direction with respect to the plunger 84. However, the knob may freely rotate, and the rotation of the knob 88 raises and lowers the plunger which causes the friction wheel 74 to be axially positioned on the shaft 70.

As will be appreciated from FIGS. 2 and 6, a spring anchor projection 98 is defined on the lever arm 56, and a tension spring 100 is connected to the frame 10 and the end of the projection 98 to bias the lever arm in a clockwise direction, as shown in FIG. 2. Such biasing action tends to maintain the friction drive wheel 74 in engagement with the driving surface 54 of the disk 52.

The engine 24 includes a crankshaft 102 which extends through an opening 104 defined in the central region of the deck 20. The engine 24 also includes a camshaft extension 106 having grooves defined thereon for cooperation with a flexible power transmission belt 108. The belt 108 passes over the sheave 72 and tension is maintained in the belt by a belt-tightening roller 110 rotatably mounted upon a pivotally supported lever 112, FIG. 2. The lever 112 pivots about the pin 114, and a spring 116 biases the roller 110 into engagement with the belt 108 to maintain the desired tension thereon.

It will, therefore, be appreciated that during operation of the engine, the shaft 70 will be rotated by the engine and belt 108. Rotation of the shaft 70 causes the friction drive wheel 74 to rotate and during engagement of the periphery of the friction drive wheel with the drive surface 54 of the disk 52, rotative power will be transmitted to the drive shaft 42 and to the rear drive wheels 30. Rotation of the knob 88 will radially position the point of contact of the friction drive wheel 74 with the drive surface 54 and, thereby, vary the ratio of power transmission from the friction drive wheel to the disk 52. Thus, an infinitely variable adjustment is provided for regulating the speed at which the mower is driven at any given engine speed.

Clutching of the mower propelling mechanism is accomplished through positioning of the handle 32. The lever arm 56 includes a rearwardly extending extension 118, FIGS. 2 and 6. A cable 120 is affixed at one end to the extension 118 and passes about a pulley 122 affixed to the frame 10, FIG. 6. The other end of the cable 120 is attached to the handle projection 38. Thus, when the handle 32 is lowered to the lower handle portion which is the normal "at rest" position, as represented in FIG. 1, the cable 120 is tensioned to pull the lever arm 56 away from the disk 52 to the dotted line position shown in FIG. 2. Such pivoting of the lever arm 56 disengages the friction drive wheel 74 from the disk 52 and although the friction drive wheel continues rotating, no power is transmitted to the disk and the drive shaft 42. It is to be appreciated that the degree of pivoting of the lever arm 56 need only be sufficient to disengage the friction wheel from the disk, and a movement of an eighth of an inch or less of the lever arm is sufficient.

When the operator desires to engage the self-propelling mechanism, the hand grip portion of the handle is raised to slacken the cable 120 and permit the spring 100 to bias the lever arm 56 in the clockwise direction, FIG. 2, to engage the friction drive wheel 74 with the disk driving surface 54.

Due to the frictional nature of the drive connection between the friction drive wheel and the disk 52, and as the lifting of the handle is usually not abrupt, there is a tendency for a limited degree of slippage to initially occur between the friction wheel 74 and the disk 52, as the friction wheel engages the disk. This characteristic permits the mower to have a smooth acceleration from a dead stop and minimizes the likelihood of the operator losing control of the lawn mower due to an abrupt or sudden start.

The rear portion of the lawn mower frame 10 is provided with a chamber portion 124, in which the transmission apparatus is located. A cover plate 126 encloses the upper portion of the transmission chamber and is provided with an opening 128 through which the knob 88 extends. The opening 128 is of sufficient dimension to permit uninhibited pivoting of the lever arm 56 between the friction wheel-disk engaged and disengaged relationships. Thus, only the knob 88 is visible to the operator and as the drive mechanism is completely enclosed, the only visible difference between a self-propelled mower in accord with the invention and the conventional push mower is the knob 88. The mechanism may be of a concise configuration wherein the cover plate 126 is approximately at the same horizontal level as portions of the front frame deck and, thus, the drive mechanism permits a self-propelled mower to be attractively styled and no significantly protruding components are present which might snag upon low-hanging shrubs and bushes. Also, as the blade housing 26 is spaced below the belt 108 and camshaft extension 106, grass cuttings and dirt are substantially prevented from contact with these components and prevented from entering the transmission chamber.

FIG. 8 illustrates a low-cost embodiment employing the inventive principles wherein no adjustment is possible in the speed at which the mower is driven. In FIG. 8, a drive shaft 42' and a disk 52', similar to those disclosed in the previously described embodiment, are used. The lever arm 130 is mounted on the frame member 10' by a pivot pin 132 and supports a pair of antifriction bearings 134 rotatably supporting a shaft 136. A pulley 138 is mounted on the shaft 136 for rotation therewith, and friction wheel 140 is mounted adjacent the pulley 138. The friction wheel 140 is provided with a high friction material 142 at its periphery for increasing the frictional contact with the disk 52'. A clutching cable extension 144 is provided on the lever arm 130 and spring means, not shown, are employed to bias the lever arm in a direction tending to engage the friction drive wheel 140 with the disk 52'. The pulley 138 is connected to the engine camshaft extension, not shown, by the belt 146. The apparatus of FIG. 8 operates identically to that previously described, whereby pivoting of the mower handle engages and disengages the friction drive wheel with the disk. However, by eliminating the structure for permitting radial adjustment of the friction wheel relative to the drive shaft 42', a substantial reduction in cost is possible over the variable speed embodiment disclosed in FIGS. 1 through 7.

For safety and starting purposes, it is highly desirable to permit clutching and declutching of the cutting blade relative to the engine. Starting of the engine is simplified if the blade is declutched therefrom, and the safety of the mower is significantly improved if the blade may be clutched and declutched from the engine while the engine is running. Also, by providing a friction clutch between the blade and the engine crankshaft, the possibility of damaging the engine crankshaft due to the blade engaging an immovable object, is substantially reduced.

With reference to FIGS. 10 and 11, the lower end of the engine crankshaft 102 includes a threaded bore 148. A clutch element hub 150 is attached to the lower end of the engine crankshaft 102 by means of a bolt 152 threaded into the bore 148. The hub 150 is of a cylindrical configuration and includes a flange 154. An annular ring 156 of friction material is mounted on the hub 150 by rivets 158 extending through the hub flange. The clutch ring 156 is, preferably, formed of a high friction composition material, and is provided with a conical outer periphery 160. The conical periphery 160 converges toward the engine in an upward direction and may be considered to be facing in an axial direction, due to the converging configuration.

A cylindrical sleeve 162 is mounted upon the crankshaft 102, and a sleeve bearing 164 circumscribes the sleeve 162 for rotation thereon. An annular blade support 166 is mounted on the bearing 164 and includes a lower annular boss 168 and a yoke-receiving recess 170 having a radially extending operating surface 172. The blade support 166 is provided with an internal conical surface 174 which is complementary to the periphery 160 of the clutch ring 156. An antifriction bearing 176 is mounted on the crankshaft 102 and interposed between a shoulder 178 defined on the crankshaft and the sleeve 162. The outer race of the bearing 176 serves as an anchor for a compression spring 180. The other end of the compression spring 180 is received within the recess 182 defined in the blade support 166 whereby the spring 180 biases the blade support in a downward direction toward engagement with the clutch ring 156. It will, therefore, be appreciated that the blade support 166 is concentrically mounted upon the engine crankshaft and in dependence on its axial position upon the crankshaft 102 may be engaged or disengaged from the clutch ring, as represented in FIGS. 10 and 11, respectively.

An elongated cutting blade 184 is mounted on the lower end of the blade support 166 by a plurality of bolts 186 received within threaded holes defined in the boss 168. A plate 188 encloses the usual center hole defined in the blade 184 and is held in place by the bolts 186.

As will be appreciated from FIG. 3, the blade housing 26 is provided with an opening 190 through which the blade clutch apparatus projects, whereby the blade may be located within the blade housing. A plate 192 partially encloses the opening 190 to reduce the possibility of dirt and grass being thrown upward toward the blade clutch.

Actuation of the blade clutch apparatus is accomplished through a foot-operated pedal or lever 194, FIG. 9, pivotally mounted on the frame 10 by a pivot pin 196 supported on bracket 197. The lever 194 includes a foot pedal 198 which extends from the rear of the mower and is readily accessible to the operator. The clutch actuating apparatus includes a rod 200 reciprocally mounted within a bracket 202 attached to the frame. The rearmost end of the rod 200 is linked to a channel-shaped 204 pivotally connected at 206 to the lever 194. The link 204 is so shaped as to clear the drive shaft 42. A turnbuckle connection 208 and pivot pin 209 adjustably connects the linkage rod 200 with the link 204, and a spring 210 interposed between the bracket 202 and the pivot 209 tends to bias the rod 200 to the right, as shown in FIGS. 2 and 9.

A bracket 212 affixed to the underside of the mower frame below the engine supports a pivot pin 214 on which a yoke lever 216 is pivotally mounted. The yoke lever 216 includes an upwardly extending projection to which the end of the rod 200 is connected by a pin 218. The yoke includes a pair of spaced parallel arms 220 disposed on opposite sides of the engine crankshaft and each of the arms includes a block 222 of a composition high friction material adapted to be received within the blade support recess 170, as will be apparent from FIG. 10. A torsion spring 224 disposed about the pin 214 tends to bias the arms 220 downwardly.

It will, therefore, be appreciated that when the foot lever 194 is in the full-lined position shown in FIG. 9, the rod 200 will be under tension to pivot the arms 220 in an upward direction. Pivoting of the arms 220 in an upward direction engages the friction blocks 222 with the blade support surface 172, as shown in FIG. 11, and raises the blade support relative to the crankshaft and the clutch ring 156. Thus, disengagement of the clutch ring and the blade support 166 is produced, which declutches the blade support and blade from the engine crankshaft. Simultaneously, the frictional engagement of the blocks 222 with the surface 172 will brake the rotation of the blade support 166, and quickly cause rotation of the blade support to cease.

When it is desired to engage the blade, the operator places his toe under the pedal 198 and lifts upwardly on the lever 194. As the pivot pins 196, 206, and 209 are in an "overcenter" relationship when the pivot pins are in the full-lined position shown in FIG. 9, the full-lined position will normally be maintained in spite of the pull of spring 210. Raising of the lever 194 above the "overcenter" relationship, permits the spring 210 and spring 224 to move the rod 200 toward the engine crankshaft and lower the yoke arms 220. The lowering of the yoke arms and blocks 222 permits the blade support to lower into engagement with the periphery 160 of the clutch ring 156, and establishes a frictional driving engagement between the engine and the blade, as shown in FIG. 10. As the blocks 222 are disengaged from the blade carrier surface 172 when the engine and blade are clutched, no frictional drag is applied to the blade carrier.

It will, therefore, be appreciated that a very concise, yet effective, clutching of the blade to the motor crankshaft is provided. It will be noted that the blade and blade carrier are actually raised and lowered during the blade declutching and clutching operations, respectively. While such vertical movement of the blade during clutching and declutching is limited, the raising of the blade when in the declutched position increases the clearance between the blade and the terrain when the mower is being transported from one location to another, and is of particular advantage if small curbs, driveways, stone or similar terrain obstructions are present.

It is appreciated that various modifications to the disclosed embodiments of the inventive concepts may be apparent to those skilled in the art without departing from the spirit and scope thereof, and it is intended that the invention be defined only by the scope of the following claims.

We claim:
1. A self-propelled lawn mower comprising, in combination:
   (a) a frame member having grass-cutting means mounted thereon,
   (b) motor means mounted upon said frame member,
   (c) a plurality of ground wheels rotatably mounted on said frame member supporting said frame member, at least one of said ground wheels comprising a drive wheel,
   (d) a drive shaft rotatably mounted on said frame member in driving connection with said drive wheel,
   (e) a disk mounted on said drive shaft having a friction drive surface transversely disposed to said drive shaft,
   (f) a lever arm mounted on said frame member adjacent said disk for pivotal movement about an axis transverse to said drive shaft,
   (g) a friction wheel having a high friction periphery rotatably supported on said lever arm for rotation about an axis transversely disposed to said drive shaft, said friction wheel axis of rotation being spaced from said lever arm pivot axis,
   (h) a sheave mounted on said lever arm concentric with said friction wheel axis adapted to drive said friction wheel,
   (i) biasing means biasing said lever arm in a direction for engaging said friction wheel with said disk drive surface, and
   (j) drive means connecting said sheave with said motor means for rotating said friction wheel, disk and drive wheel.

2. A self-propelled lawn mower comprising, in combination:
   (a) a frame member having grass-cutting means mounted thereon,
   (b) motor means mounted upon said frame member,
   (c) a plurality of ground wheels rotatably mounted on said frame member supporting said frame member, at least one of said ground wheels comprising a drive wheel,
   (d) a drive shaft rotatably mounted on said frame member in driving connection with said drive wheel,
   (e) a disk concentrically mounted on said drive shaft having a flat drive surface perpendicularly disposed to said drive shaft,
   (f) an arm mounted on said frame member adjacent said disk for movement toward and away from said disk,
   (g) a shaft rotatably mounted on said arm,
   (h) a friction wheel having a high friction periphery concentrically mounted on said shaft,
   (i) a sheave concentrically mounted on said shaft,
   (j) biasing means biasing said arm in a direction for engaging said friction wheel with said disk drive surface, and
   (k) drive means connecting said sheave with said motor means for driving said friction wheel, disk and drive wheel.

3. A self-propelled lawn mower comprising, in combination:
   (a) a frame member having grass cutting means mounted thereon,
   (b) motor means mounted upon said frame member,
   (c) a plurality of ground wheels rotatably mounted on said frame member supporting said frame member, at least one of said ground wheels comprising a drive wheel,
   (d) a drive shaft rotatably mounted on said frame member in driving connection with said drive wheel,
   (e) a disk mounted on said drive shaft having a friction drive surface transversely disposed to said drive shaft,
   (f) an arm mounted on said frame member adjacent said disk for movement toward and away from said disk,
   (g) a friction wheel rotatably supported on said arm for rotation about an axis transversely disposed to said drive shaft,
   (h) means for selectively, radially positioning said friction wheel relative to said drive shaft,
   (i) biasing means biasing said arm in a direction for engaging said friction wheel with said disk drive surface, and
   (j) drive means connecting said friction wheel with said motor means whereby said friction wheel drives said disk, drive shaft and said drive wheel.

4. In a self-propelled lawn mower as in claim 3 wherein:
   (a) said frame member includes a housing having an upper deck, said grass-cutting means being located within said housing below said deck,
   (b) said drive shaft, disk, lever arm and friction wheel being located within the confines of said housing below said deck, and
   (c) said means selectively, radially positioning said friction wheel relative to said drive shaft includes an actuating knob, said knob extending through said upper deck for access exteriorly of said housing.

5. In a self-propelled lawn mower as in claim 1:
   (a) a mower steering handle pivotally mounted on said frame member having a handle portion adapted to be vertically movable between first and second positions, and
   (b) means connecting said handle to said lever arm whereby positioning said handle portion at said first position pivots said lever arm for engagement of said friction wheel with said disk drive surface and positioning said handle portion at said second position pivots said lever arm to disengage said friction wheel and disk drive surface.

6. In a self-propelled lawn mower as in claim 1:
   (a) a mower steering handle pivotally mounted on said frame member having a handle portion adapted to be vertically movable between first and second positions, and
   (b) a cable connecting said handle to said lever arm whereby positioning said handle portion at said first position permits said biasing means to pivot said lever arm for engagement of said friction wheel and disk drive surface, positioning said handle portion at said second position tensioning said cable and pivoting said lever arm away from said disk to disengage said friction wheel and disk drive surface.

References Cited

UNITED STATES PATENTS

| | | | |
|---|---|---|---|
| 1,116,390 | 11/1914 | Davis | 56—26 |
| 2,076,056 | 4/1937 | Woodford | 56—25.4 |
| 2,942,487 | 6/1960 | Claus | 74—197 |
| 3,035,385 | 5/1962 | Lill | 56—25.4 |
| 3,059,397 | 10/1962 | Anderson et al. | 56—25.4 |

ANTONIO F. GUIDA, *Primary Examiner.*

J. W. PETERSON, *Assistant Examiner.*

U.S. Cl. X.R.

74—194